US011345286B1

(12) United States Patent
Filandrianos

(10) Patent No.: US 11,345,286 B1
(45) Date of Patent: May 31, 2022

(54) SUPPORT DEVICE FOR VEHICLE RACKS

(71) Applicant: Nikolaos Emmanuel Filandrianos, Brighton, MA (US)

(72) Inventor: Nikolaos Emmanuel Filandrianos, Brighton, MA (US)

( * ) Notice: Subject to any disclaimer, the term of this patent is extended or adjusted under 35 U.S.C. 154(b) by 375 days.

(21) Appl. No.: 16/435,536

(22) Filed: Jun. 9, 2019

Related U.S. Application Data

(60) Provisional application No. 62/683,003, filed on Jun. 10, 2018.

(51) Int. Cl.
| | |
|---|---|
| *B60R 9/045* | (2006.01) |
| *B60R 9/048* | (2006.01) |
| *B60R 9/058* | (2006.01) |
| *B60R 9/06* | (2006.01) |
| *B60R 9/10* | (2006.01) |

(52) U.S. Cl.
CPC ............... *B60R 9/10* (2013.01); *B60R 9/045* (2013.01); *B60R 9/048* (2013.01); *B60R 9/058* (2013.01); *B60R 9/06* (2013.01)

(58) Field of Classification Search
CPC ....... B60R 9/045; B60R 9/048; B60R 9/0485; B60R 9/058; B60R 9/06; B60R 9/10
USPC ........................................ 224/309, 412, 493
See application file for complete search history.

(56) References Cited

U.S. PATENT DOCUMENTS

| | | | | |
|---|---|---|---|---|
| 3,921,869 | A | * | 11/1975 | Rogers ...................... B60R 9/10 224/500 |
| 8,733,605 | B2 | * | 5/2014 | Pedrini ..................... B60R 9/10 224/488 |
| 2006/0138186 | A1 | * | 6/2006 | Pedrini ..................... B60R 9/06 224/497 |
| 2009/0321488 | A1 | * | 12/2009 | Sautter ..................... B60R 9/10 224/493 |
| 2010/0122782 | A1 | * | 5/2010 | Fox ......................... B60J 1/2011 160/370.21 |
| 2015/0210223 | A1 | * | 7/2015 | Nusbaum .................. B60R 9/10 224/533 |
| 2017/0259750 | A1 | * | 9/2017 | Lucas ....................... B60R 9/06 |
| 2019/0061637 | A1 | * | 2/2019 | Salsi ......................... B60R 9/06 |

FOREIGN PATENT DOCUMENTS

SE 201300427 A1 * 12/2014 ............... B60R 9/10

\* cited by examiner

*Primary Examiner* — Joshua E Rodden

(57) ABSTRACT

A device includes at least one strap support. The strap support has a top surface and a bottom surface. The bottom surface is configured to contact a windshield of a vehicle, and the top surface having a groove configured to receive a strap. The strap support is further configured to displace the strap above an edge of a spoiler of the vehicle, so as to provide clearance between the strap and the spoiler when the strap is used to secure an object to the vehicle.

20 Claims, 11 Drawing Sheets

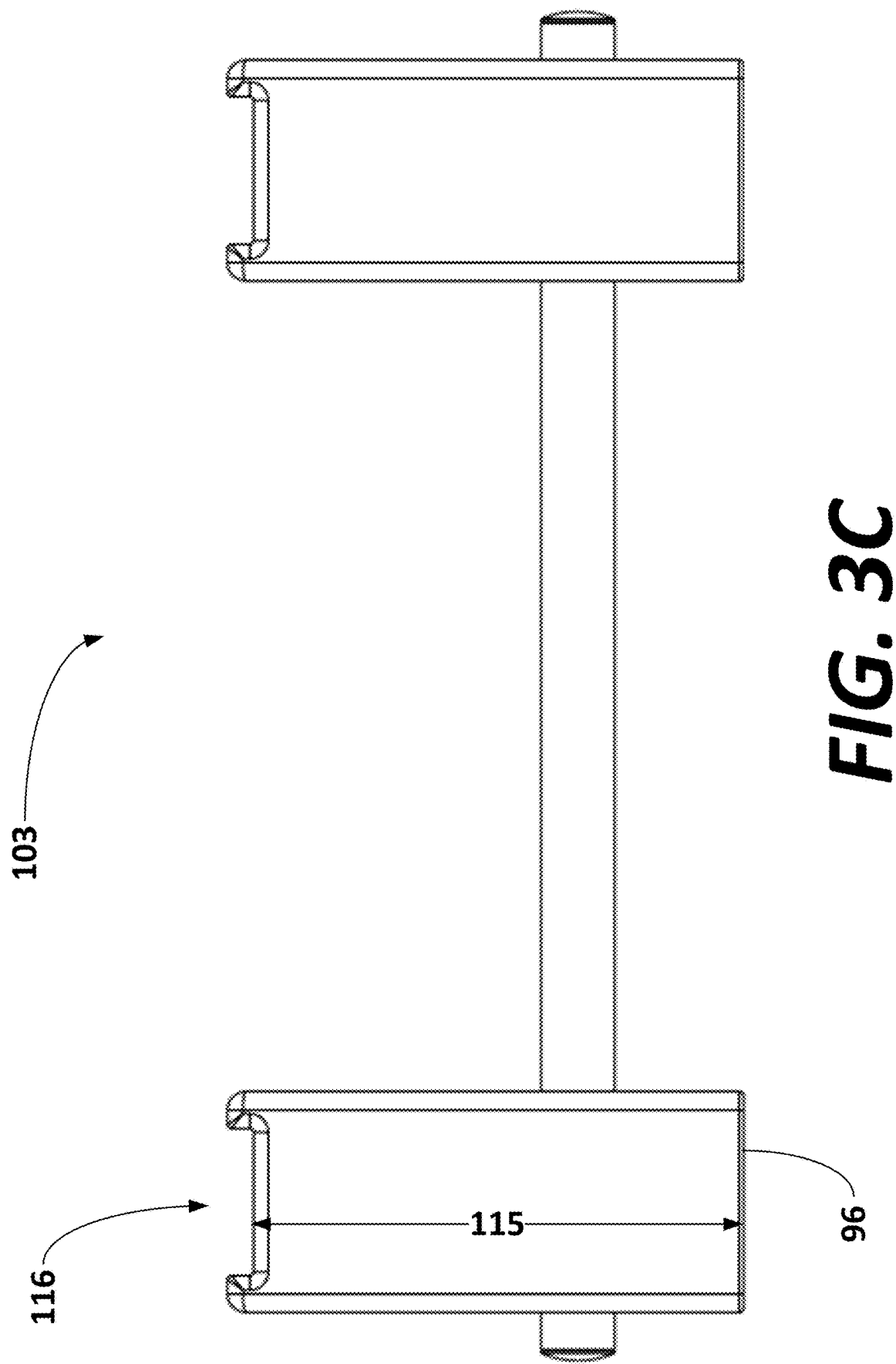

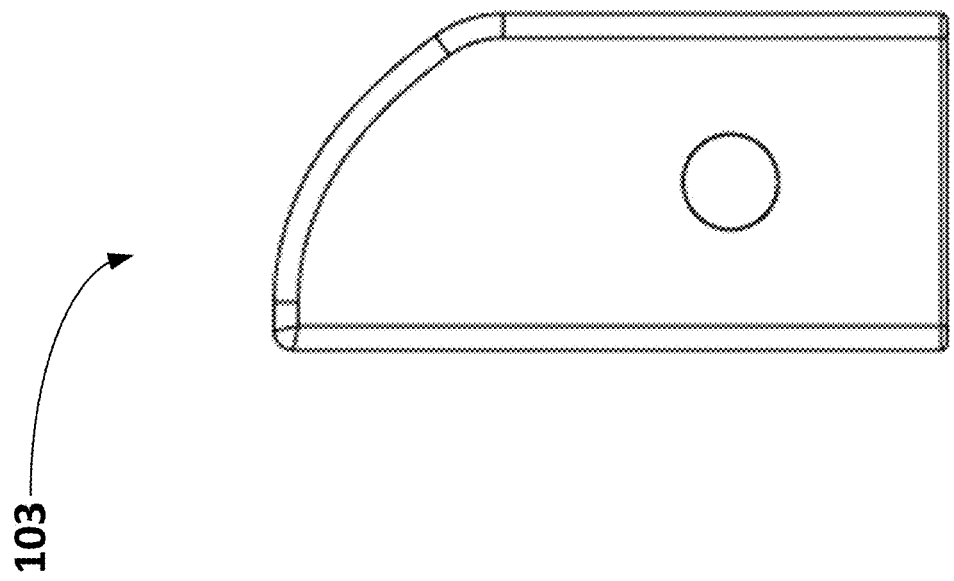
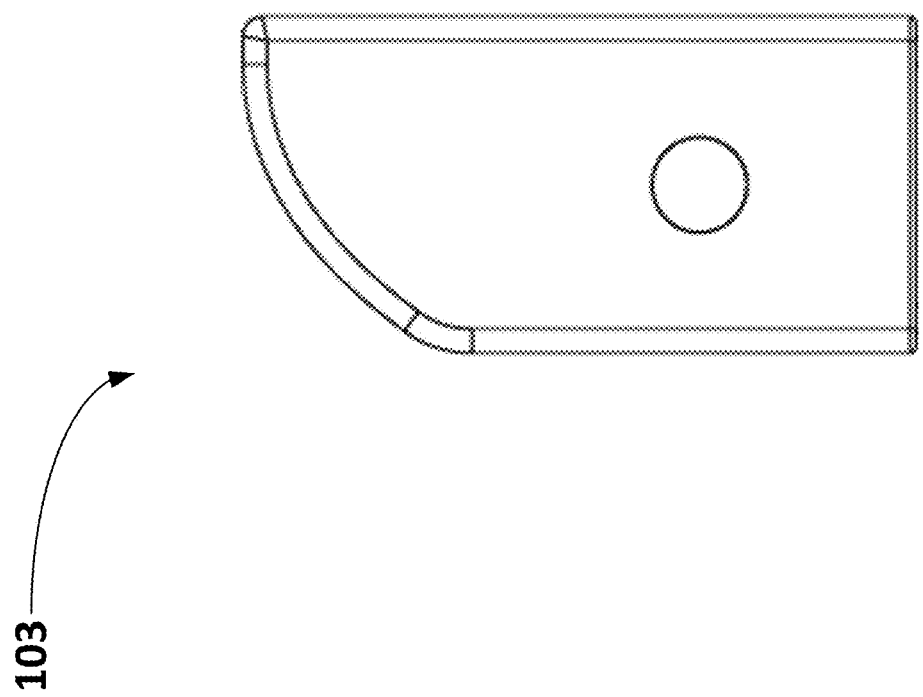
FIG. 3E
FIG. 3D

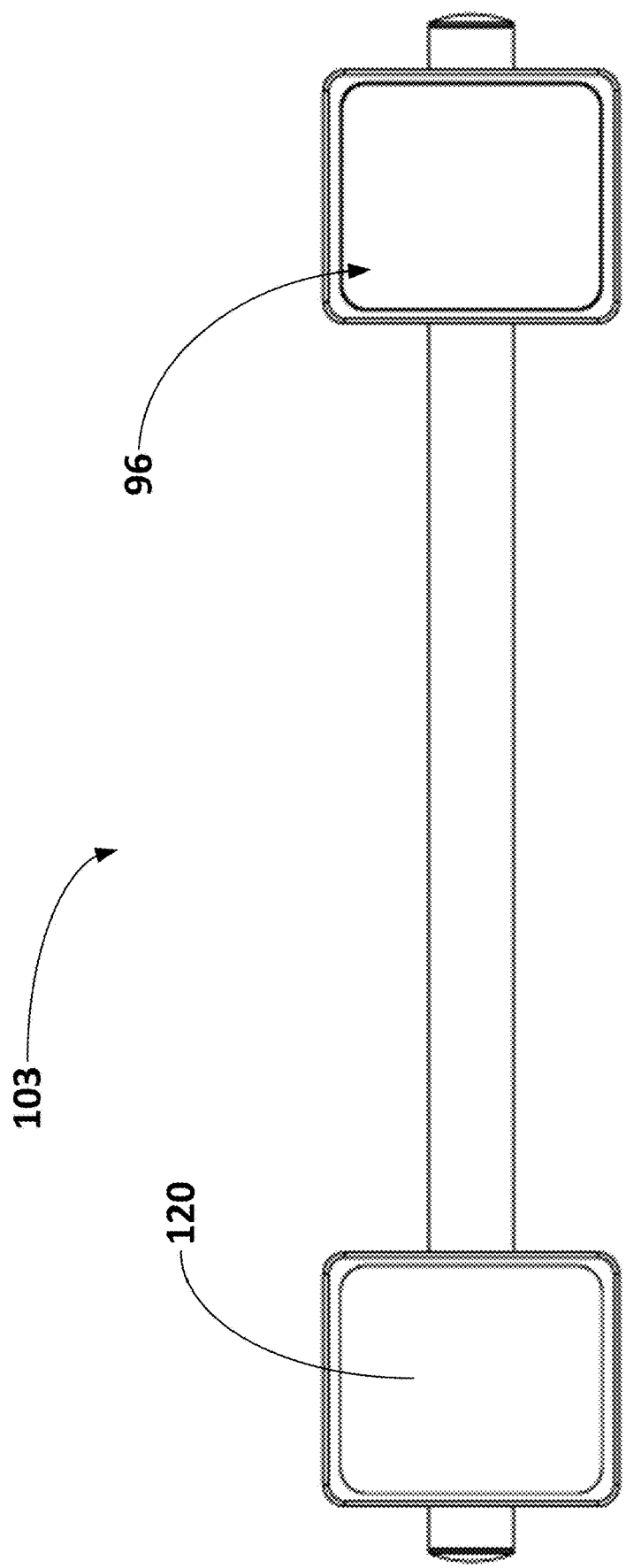

SUPPORT DEVICE FOR VEHICLE RACKS

PRIORITY

This patent application claims priority from provisional U.S. patent application No. 62/683,003, filed Jun. 10, 2018, entitled, "SUPPORT DEVICE FOR VEHICLE RACKS," and naming Nikolaos Filandrianos as inventor, the disclosure of which is incorporated herein, in its entirety, by reference.

FIELD OF THE INVENTION

Illustrative embodiments of the invention generally relate to transporting items on the back of a vehicle and, more particularly, illustrative embodiments of the invention relate to a reducing or preventing damage to the spoiler of a vehicle.

BACKGROUND OF THE INVENTION

People living active lifestyles frequently attach athletic racks (e.g., bicycle and/or snowboard racks) to the back or the top of the cars.

SUMMARY OF VARIOUS EMBODIMENTS

In accordance with one embodiment of the invention, a device includes at least one strap support. The strap support has a top surface and a bottom surface. The bottom surface is configured to contact a windshield of a vehicle, and the top surface having a groove configured to receive a strap. The strap support is further configured to displace the strap above an edge of a spoiler of the vehicle, so as to provide clearance between the strap and the spoiler when the strap is used to secure an object to the vehicle.

Among other things, the strap may be part of a bicycle-rack for a car, and the object may be a bicycle. The device may include a rod on which two strap supports are mounted. The rod may be width-adjustable, so as to allow for adjustment of the position of the two strap supports relative to one another. In some embodiments, the vehicle is a sports utility vehicle.

Some embodiments include a second strap support, which may also have a groove for receiving a strap. Furthermore, some embodiments may include an extender that is configured to couple to the bottom surface of the strap support. The extender may provide additional height to the strap support. Thus, the additional height may provide clearance between the strap and the spoiler when the strap is used to secure an object to the vehicle. Among other ways, the extender may be coupled to the strap support via attachment pins. In some embodiments, the height is between about 4 inches and about 12 inches. For example, the height may be about 7.5 inches. In some embodiments, the clearance provided is enough so that the strap does not contact the top surface of the spoiler.

To assist with maintaining the position of the strap support relative to the windshield, the strap support may have an adhesive on the bottom surface. Alternatively, or additionally, the strap support may have at least one suction cup on the bottom surface. Furthermore, the strap support may be formed from at least one of: foam, plastic, and/or rubber.

Some embodiments may have a rod that couples a plurality of strap supports together. The rod may have end caps on each end configured to prevent the strap support from dismounting from the rod.

In accordance with another embodiment, a bicycle rack couples a bicycle to a vehicle. The bicycle rack has a bicycle coupling portion configured to couple with a bicycle. The bicycle rack also has a car attachment portion configured to couple with a car. The car attachment portion includes straps. The bicycle rack also has at least one strap support. The strap support has a top surface and a bottom surface. The bottom surface is configured to contact a windshield of a vehicle, and the top surface has a groove configured to receive a strap. The strap support is further configured to displace the strap above an edge of a spoiler of the vehicle, such that clearance is provided between the strap and the spoiler when the strap is used to secure an object to the vehicle.

The clearance provided between the strap and the spoiler may be a vertical clearance and a horizontal clearance.

In accordance with yet another embodiment, a method attaches a rack to a vehicle having a spoiler. The method provides a rack having straps. The straps have a first end and a second end. The method attaches the first end of the strap to a strap attachment portion of a vehicle having a spoiler with an edge. The edge of the spoiler defines a spoiler height. The method positions the strap in a groove of a strap support. The strap support contacts a rear windshield of the vehicle. The highest portion of the groove defines a groove height. The groove height is above the spoiler height.

In some embodiments, the rack is a bicycle rack. The method may also couple a bicycle to the rack. Additionally, the method may tension the straps. The method may also provide a clearance between the strap and the spoiler. The clearance may be a horizontal clearance and/or a vertical clearance. The method may position the strap support up against the spoiler of the vehicle.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below. The patent or application file contains at least one figure executed in color. Copies of this patent with color drawing(s) will be provided by the Patent and Trademark Office upon request and payment of the necessary fee.

FIGS. 3A-3G show various views of the support device in accordance with illustrative embodiments of the invention.

DESCRIPTION OF ILLUSTRATIVE EMBODIMENTS

In illustrative embodiments, a device is configured to displace pressure that may otherwise damage a spoiler (e.g., a rear hatch spoiler) of a vehicle. For example, the device may be used with bicycle-racks that attach to cars, for example, by using straps. The device contacts the straps of the rack, and displaces the straps from contact with the spoiler. Generally, the straps are supporting an object (e.g., a bicycle). By displaying the straps from the spoiler, damage to the spoiler may be reduced or eliminated. Details of illustrative embodiments are discussed below.

Figure 1:
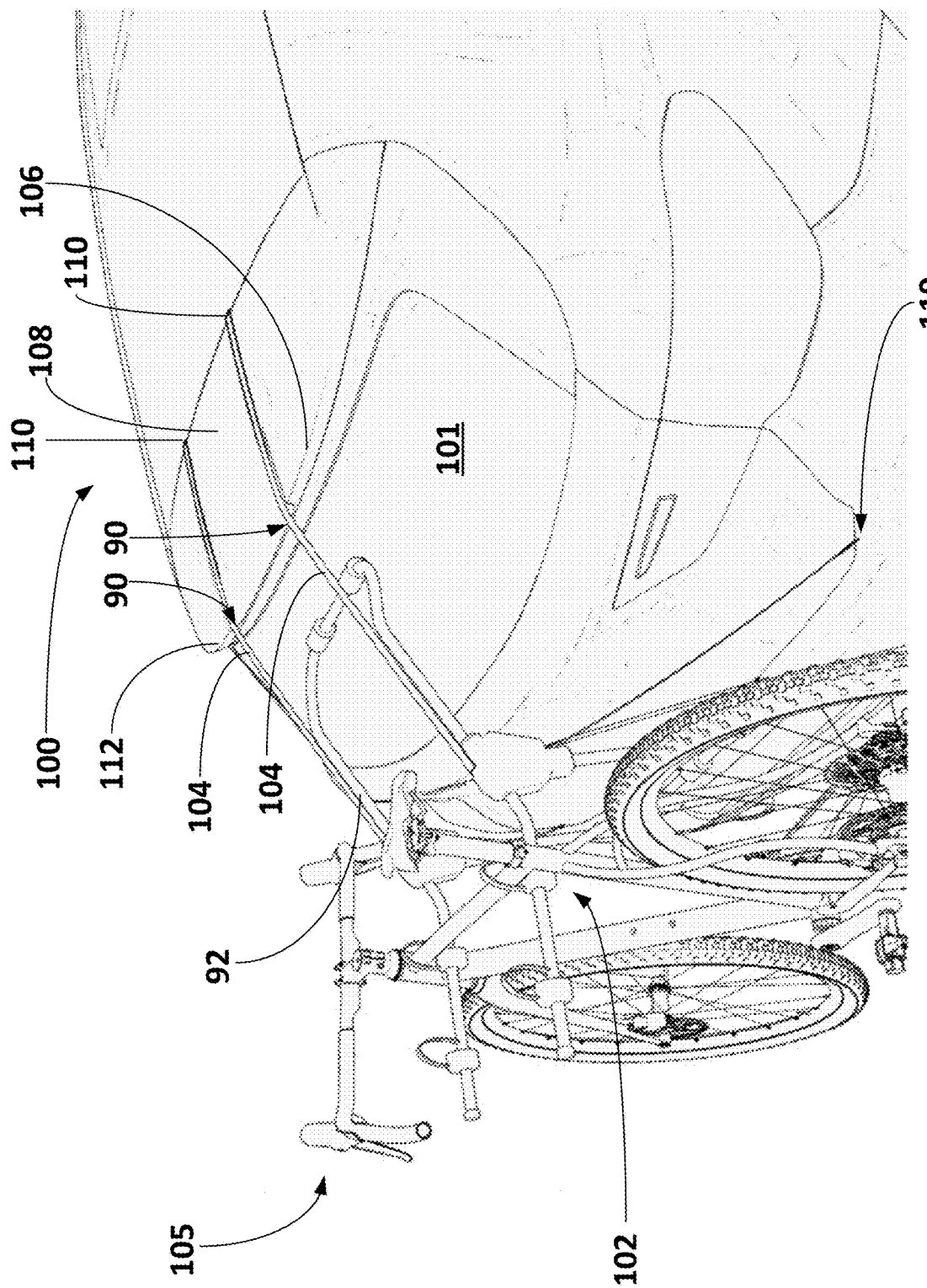
FIG. 1 shows a bicycle rack attached to a sports utility vehicle.

FIG. 1 shows a bicycle rack 102 coupled with a vehicle 100 (e.g., a sports utility vehicle 100). Like many bicycle racks 102, the bicycle rack 102 has straps 104 configured to attach an object (e.g., a bicycle 105) to the back of the vehicle 100. The bicycle rack 102 may have a strap 104 housing that is attached to an aluminum body 92, which contacts a rear portion (e.g., rear windshield 101) of the vehicle 100. Like many sports utility vehicles 100, this vehicle has a spoiler 112. The spoiler 112 has a top surface 108 and an edge 106.

In contrast to sedans, the spoiler of a SUV and/or hatchback is positioned above the rear windshield 101. The arrangement of the spoiler relative to the windshield makes conventional bicycle racks difficult to use with SUVs and/or hatchbacks. As is discussed further below, this can potentially damage the spoiler of the SUV or the hatchback.

The straps 104 of the bicycle rack 102 may run from a strap attachment point 110 on the top of the vehicle 100 along the top surface 108 of the spoiler 112 (e.g., down to a strap securement point 119). Specifically, the straps 104 contact the spoiler top surface 108 and/or the edge of the spoiler 106 when the bicycle rack 102 is attached, as identified for example by contact points 90. This contact may damage parts of the spoiler 112, such as the edge 106 or the top surface 108 through frictional contact, tugging, and/or weight from the object (e.g., bicycle 105) pulling the straps down on the spoiler 112. This can cause the spoiler 112 to warp/dent, break off from the vehicle 100, and/or discolor the spoiler 112.

Figure 2:
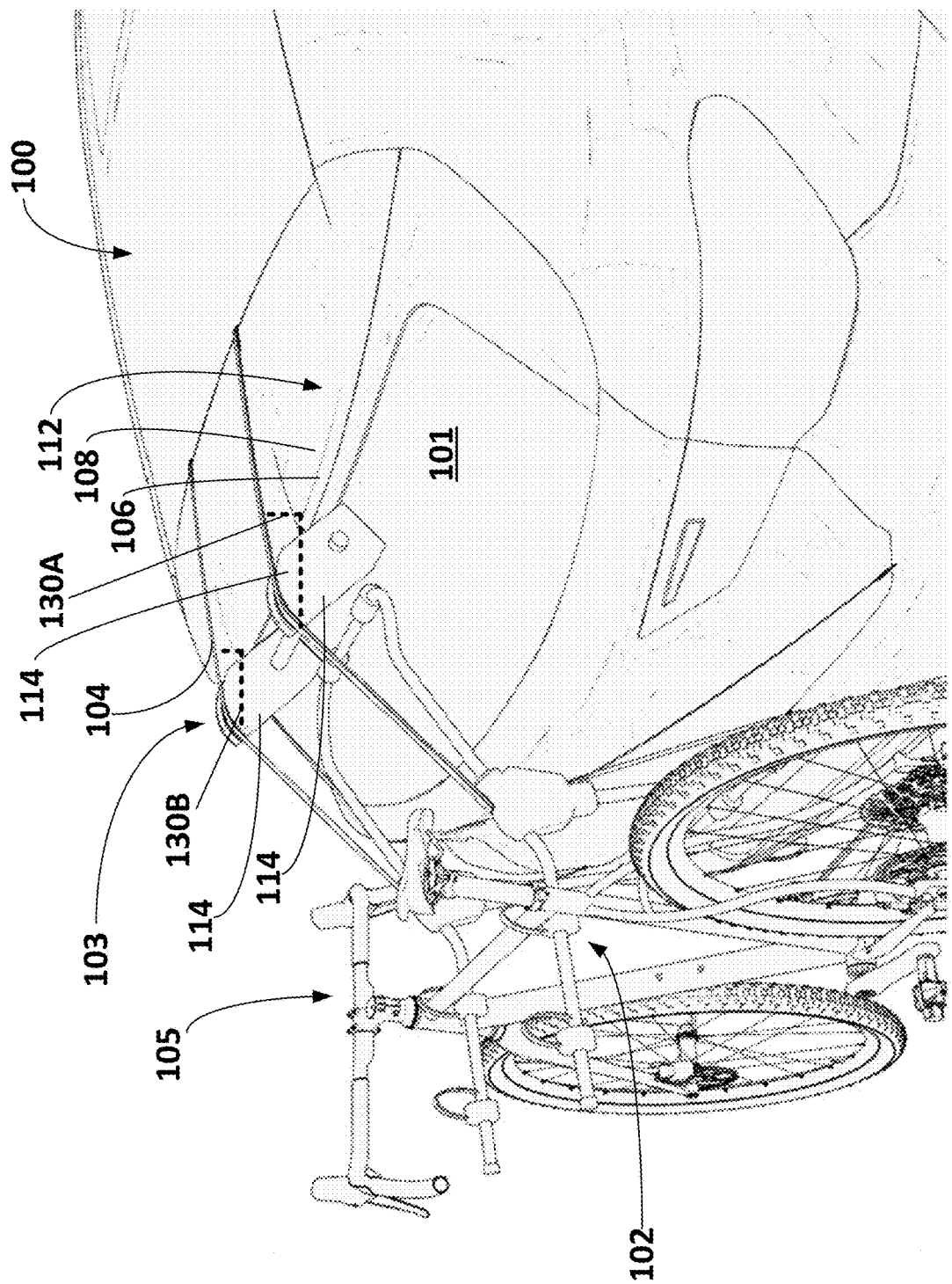
FIG. 2 shows a bicycle rack coupled to a support device and attached to a sports utility vehicle in accordance with illustrative embodiments of the invention.

FIG. 2 shows the bicycle rack 102 coupled with a support device 103 which is further coupled with a sports utility vehicle 100 in accordance with illustrative embodiments of the invention. The support device 103 has strap supports 114 that are configured to provide clearance between the spoiler 112 and the straps 104. Specifically, the strap supports 114 provide clearance (e.g., vertical clearance 130B—shown as broken vertical lines; and horizontal clearance 130B—shown as broken horizontal lines) between the straps 104 and the spoiler top surface 108 and/or edges 106. Accordingly, the contact points 90 from FIG. 1 between the strap 104 and the spoiler 112 may no longer exist. In some embodiments, there may be substantially no contact between the straps 104 and the spoiler 112 (except at the attachment points 110). A vertical clearance is represented by the broken vertical lines between the straps 104 and the spoiler 112. However, some embodiments also provide a horizontal clearance between the edge 106 and the straps 104 (not labeled). The strap support 114 may also include extensions (e.g., in the form of extender pieces that attach to the bottom of the support 114) that may be added, as will be discussed further below.

Figure 3A:
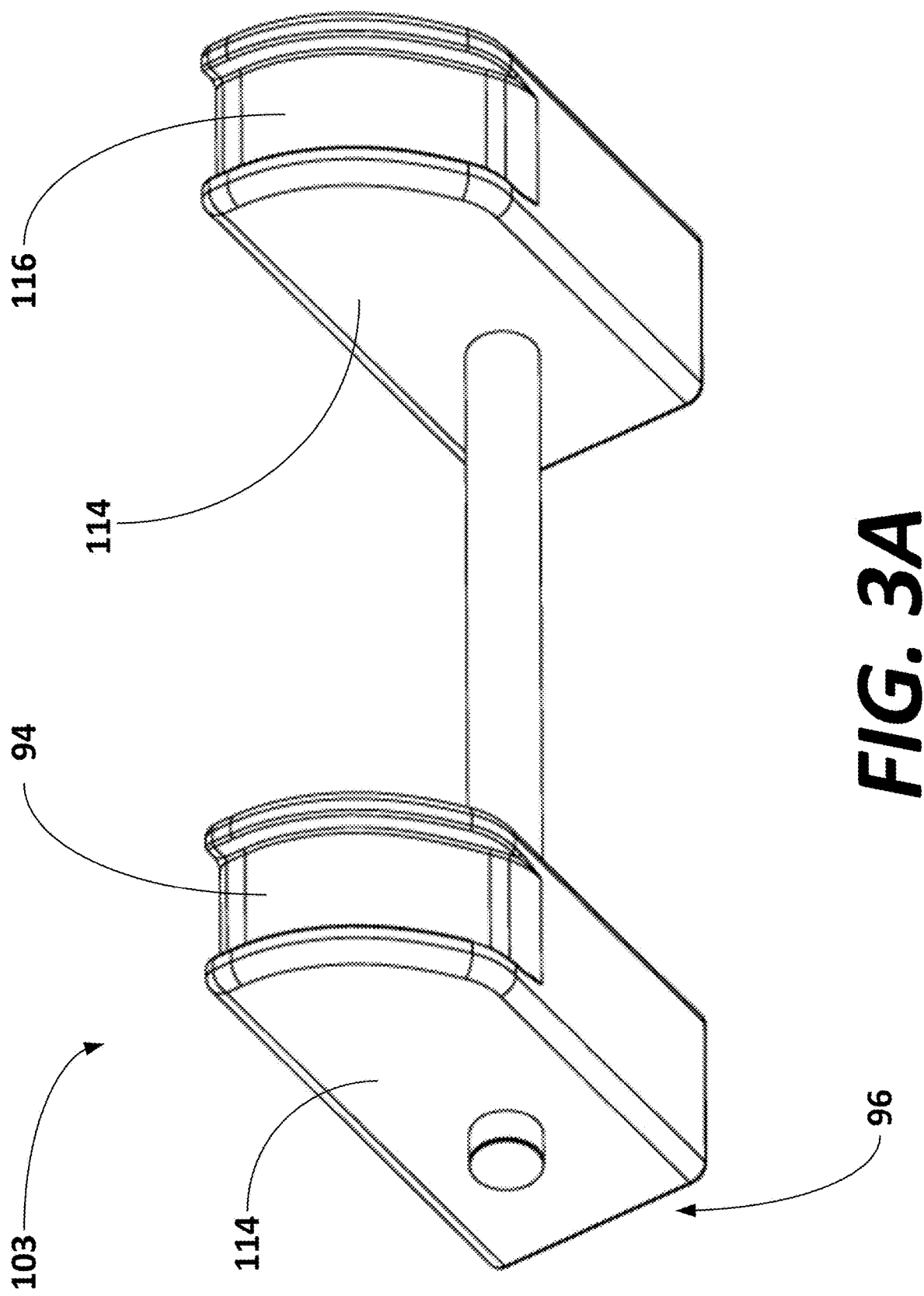
Figure 3B:
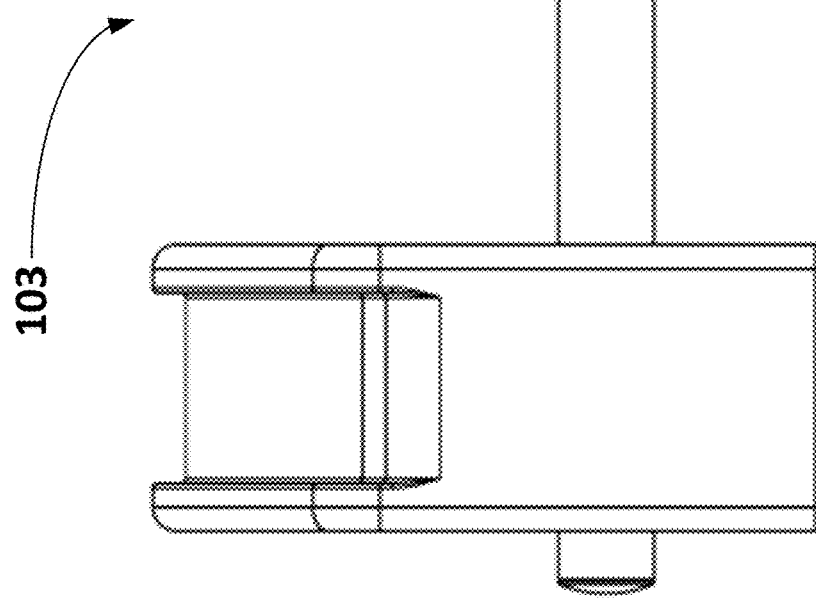
Figure 3F:
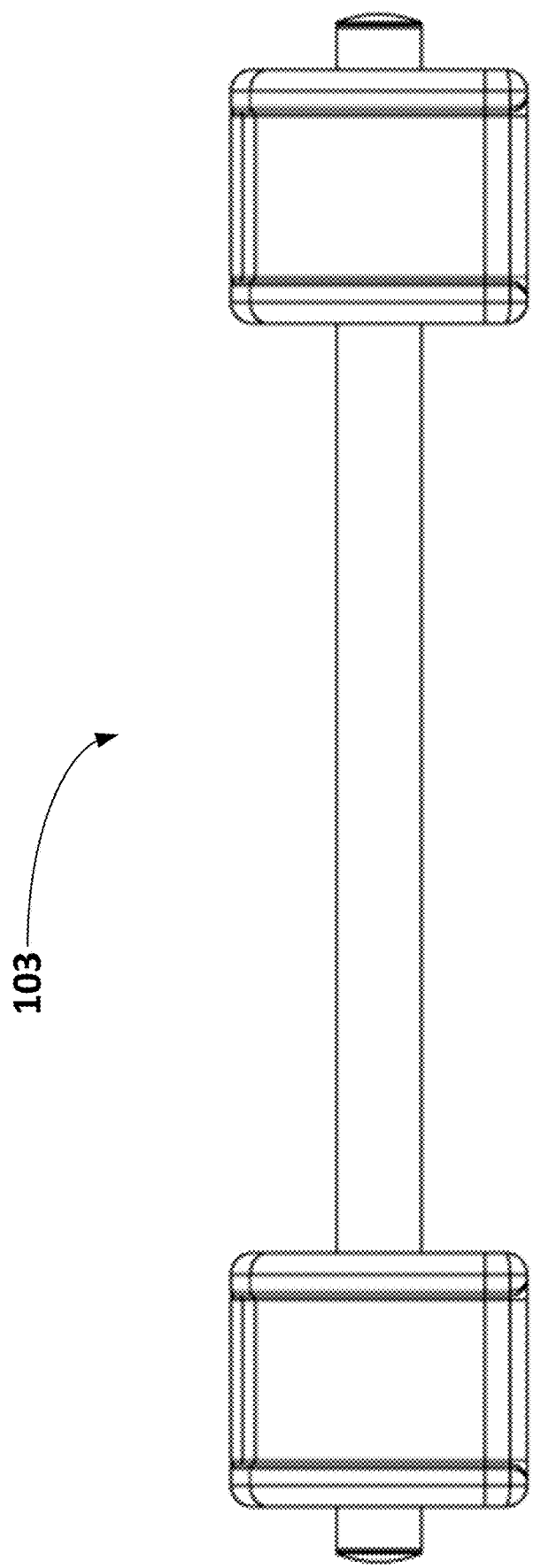

FIGS. 3A-3G show various views of the support device 103 in accordance with illustrative embodiments of the invention. FIG. 3A show a perspective view of the support device 103. FIG. 3B shows a front view of the support device 103. FIG. 3C shows a back view of the support device. FIG. 3D shows a left side view of the support device. FIG. 3E shows a right side view of the support device. FIG. 3F shows a top view of the support device. FIG. 3G shows a bottom view of the support device.

Returning to FIG. 3A, the strap supports 114 have a top surface 94 and a bottom surface 96. The bottom surface 96 has a windshield contact area 120 (e.g., see FIG. 3G) that is configured to contact the windshield 101 of the vehicle 100. In some embodiments, the bottom surface 96 may have suction cups, adhesive, and/or other features configured to help prevent and/or inhibit sliding and/or movement of the strap support 114 on the windshield 101. This may assist a user with setting up the strap supports 114.

The top surface of the strap support 114 may have a groove 116 configured to receive the strap 104. Although referred to as the top surface, when coupled to the windshield 101, the top surface may extend rearward (i.e., substantially horizontally or at an angle). Accordingly, the top surface may not necessarily be at the vertically highest point when coupled to the vehicle 100. The groove 116 prevents/inhibits the strap 104 from being accidentally dislodged from the strap support 114 while the vehicle 100 is driving. To that end, the groove 116 may be about 1 to 2 inches wide, and more preferably between 1 to 1.5 inches. This width should be sufficient to accommodate conventional strap 104 sizes. Furthermore, the groove 116 may be about 0.25 to 0.5 inches deep to assist with preventing/inhibiting dislodgement of the strap 104 (e.g., when the vehicle 100 hits a pothole).

Although the groove 116 is shown as being open, illustrative embodiments may have a covered groove 116. For example, the groove 116 may form a passageway through the strap support 114. Accordingly, the strap 104 may be slid through the groove 116. The covered groove 116 may further assist with preventing accidental dislodgement of the strap 104 from the strap support 114.

FIG. 3C schematically shows a rear view of the support device 103 in accordance with illustrative embodiments of the invention. As described previously, the support 114 provides clearance between the straps 104 and the spoiler 112. To that end, the supports 114 have a height 115 that is defined as the distance from the bottom surface 124 to the top of the groove 116. In some embodiments, the height 115 is at least about 4 inches. Furthermore, in some embodiments the height 115 is at least about 5 inches. In additional embodiments, the height 115 may be at least 7.5 inches. The inventor discovered that a height 115 of about 7.5 inches provides clearance 130 to most commercial SUV's having spoilers 112. All of the above described embodiments may have a height 115 of up to about 12 inches. Accordingly, in illustrative embodiments, the height 115 may be between about 4 inches and about 12 inches.

Figure 4:
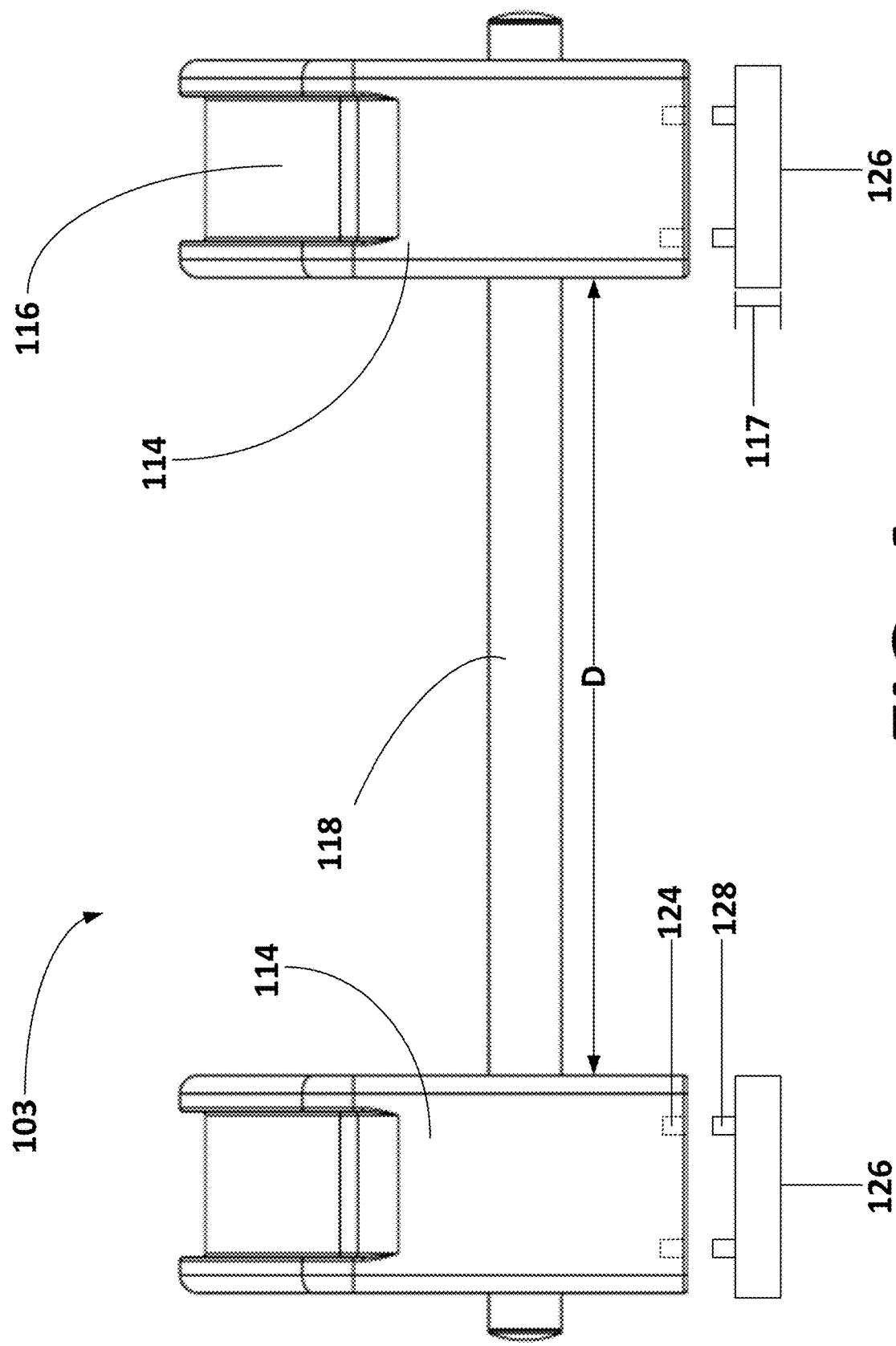
FIG. 4 shows the support device with detached extenders in accordance with illustrative embodiments of the invention.

FIG. 4 shows the support device 103 with unattached extenders 126 in accordance with illustrative embodiments of the invention. The extenders 126, as shown, are detached from the support 114. While the extenders 126 are optional, they can help add height 117 to the support 114, and thus, additional clearance between the straps 104 and the spoiler 112. Among other ways, the extenders 126 can be coupled to the strap support 114 using attachment pins 128, which may simply be inserted into pin slots 125 that extend into the support 114 from the bottom surface 124. When the extenders 126 are coupled with the strap support 114, the extenders 126 are considered to be part of the strap support 114. Thus, it should be understood that in various embodiments the bottom surface of the support 114 may be considered to be the bottom surface of the extenders 126. Furthermore, the bottom surface of the extenders 126 may have suction cups, adhesive, and/or other features configured to help prevent and/or inhibit sliding and/or movement of the strap support 114 on the windshield 101.

Illustrative embodiments may have a plurality of supports 114. However, some embodiments may have a single support 114 with a plurality of grooves 116 (e.g., a larger support 114 with two grooves 116). Some embodiments may have two supports 114 to accommodate conventional bicycle rack 102 straps 104. To that end, a rod 118 may be used to couple the supports 114 together. In some embodiments, the rod 118 is width adjustable to allow for adjustment of position of the supports 114 on the windshield 101. The distance D between the supports 114 may be adjusted, for example, to accommodate for the positions of the straps 104 (e.g., the distance between the straps 104) on various models of bicycle racks 102. Furthermore, the rod 118 may have end caps to prevent accidental dislodgement of the supports 114 from the rod 118.

Figure 5:
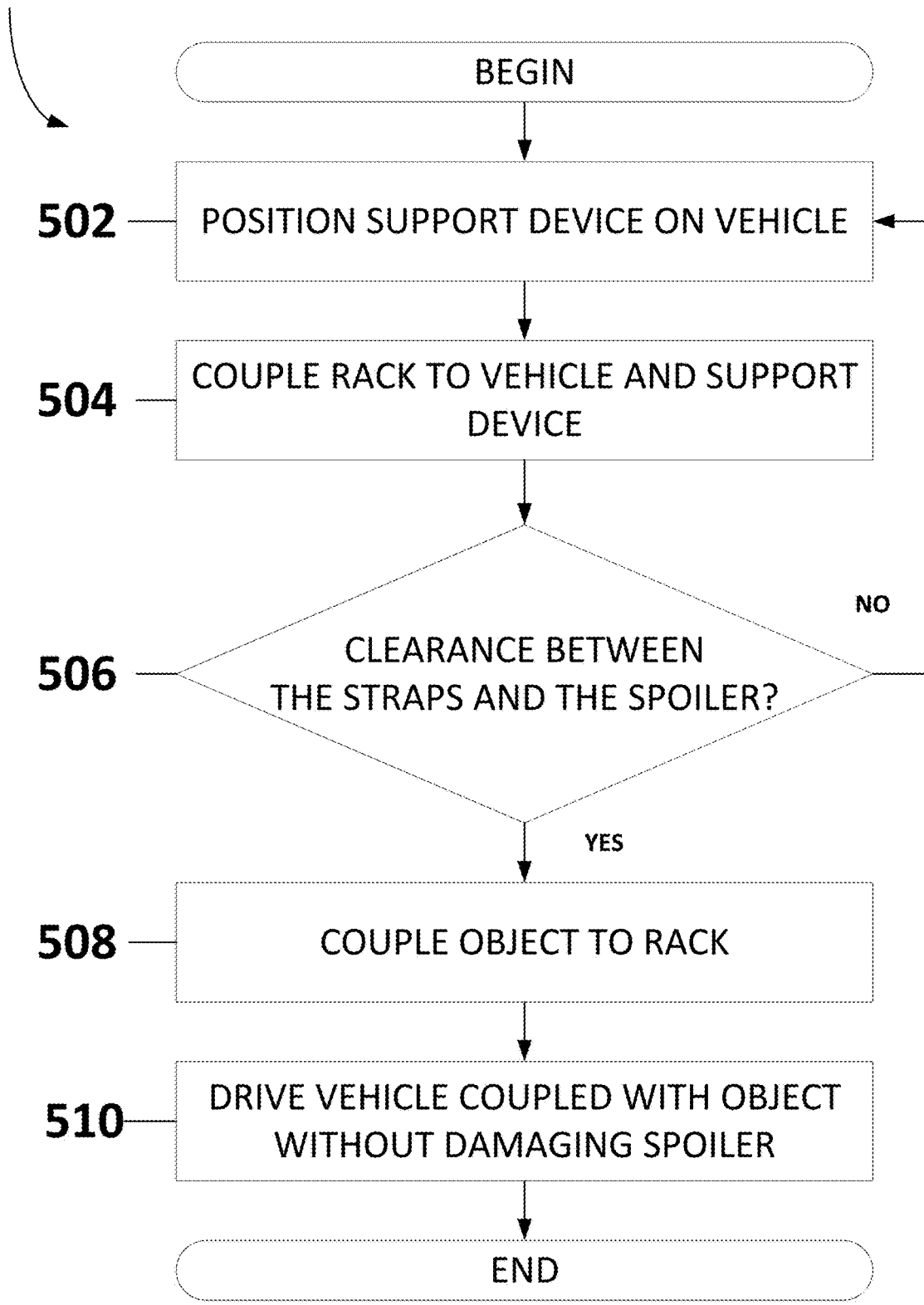
FIG. 5 shows a process of using the support device in accordance with illustrative embodiments of the invention.

FIG. 5 shows a process of using the support device 103 in accordance with illustrative embodiments of the invention. It should be noted that this method is substantially simplified from a longer process that may normally be used. Accordingly, the method shown in FIG. 5 may have many other steps that those skilled in the art likely would use. In addition, some of the steps may be performed in a different order than that shown, or at the same time. Furthermore, some of these steps may be optional in some embodiments. Accordingly, the process 500 is merely exemplary of one process in accordance with illustrative embodiments of the invention. Those skilled in the art therefore can modify the process as appropriate.

The process 500 begins with step 502, which positions the support device 103 on the rear windshield 101. For example, the support device 103 may be positioned near the top of the rear windshield 101, as shown in FIG. 6.

Figure 6:
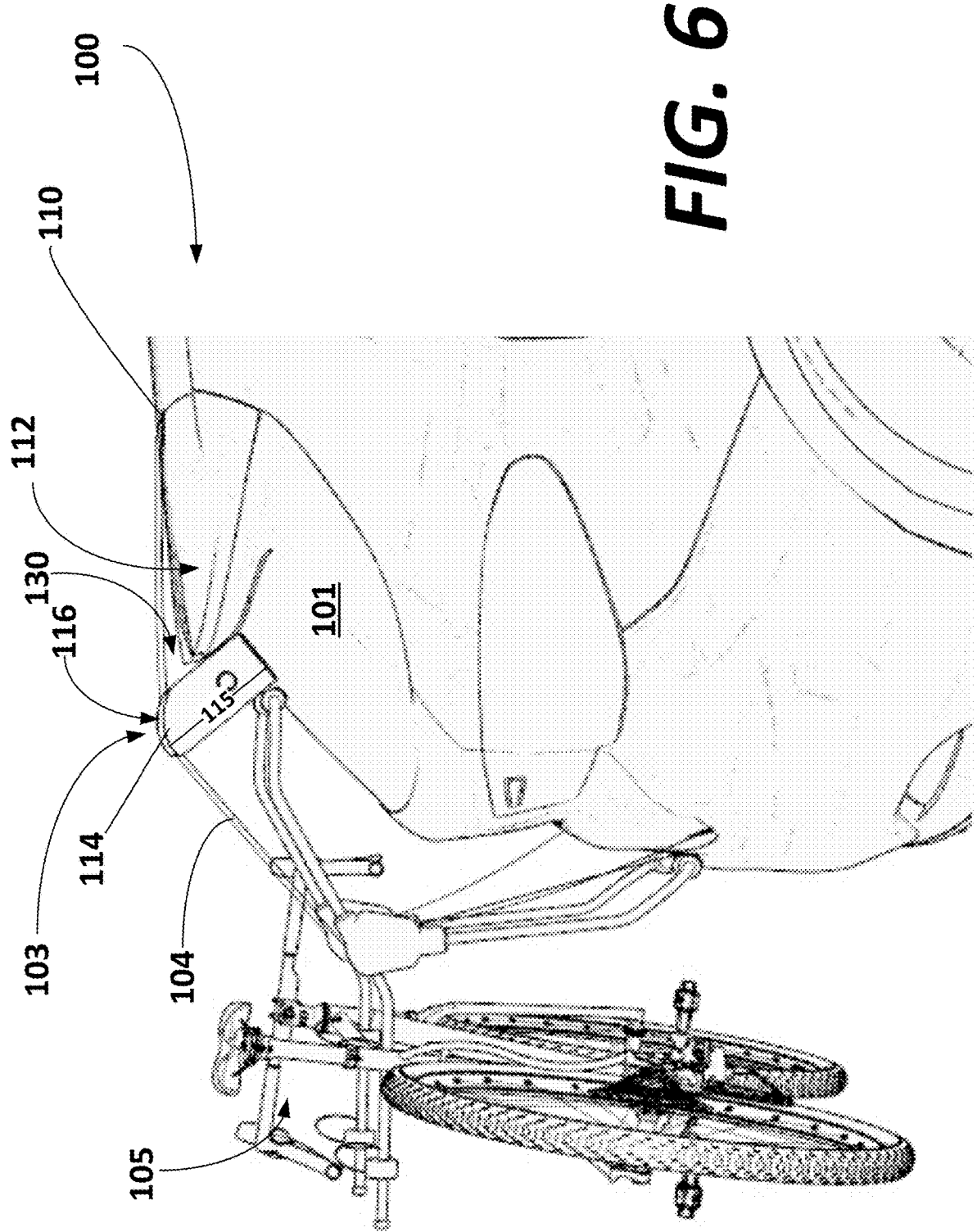
FIG. 6 shows a side view of the support device supporting a bicycle rack in accordance with illustrative embodiments of the invention.

FIG. 6 shows the placement of the support device 103 on the rear windshield 101 of a sports utility vehicle 100 in accordance with illustrative embodiments of the invention. The device 103 may be positioned anywhere on the rear windshield 101, but preferably is positioned closer to the spoiler 112. Preferably, the support 114 contacts the spoiler 112 (e.g., the edge of the spoiler). This position provides more clearance 130 between the strap 104 and the spoiler 112. The height 115 of the support 114 is measured from the windshield 101 to the top of the groove 116. Additionally, positioning the support 114 against the spoiler 112 provides support to the device 103.

The user may begin the process of using the device 103 (e.g., for mounting the bicycle 105) by first positioning the supports 114 on the windshield 101 as shown. To that end, the bottom surface 124 may have suction cups, adhesive, and/or material with a higher coefficient of friction. Furthermore, although illustrative embodiments show two supports 114, it should be understood that a single support 114 may be used. For example, a larger support 114 may be used that has a plurality of grooves 116 for receiving the straps 104.

The process 500 then proceeds to step 504, which couples the rack 102 to the vehicle 100 and the support device 103. Before or after mounting the supports 114, the user may position the straps 104 at the strap attachment point 110, and then run the straps 104 through the grooves 116 of the support 114. A person of skill in the art understands how to couple the rack 102 to the vehicle 100. However, the straps 104 are now coupled to the support device 103 (i.e., by running through grooves 116).

The process then proceeds to step 506, which asks whether there is clearance between the straps and the spoiler (e.g., when the object is coupled to the rack 102 and the straps are tensioned). As described previously, the strap support 114 provides a clearance 130 between the straps 104 and the spoiler 112. The strap 104 rests in the groove 116 (not visible from this view) that are at the height 115. The strap support 114 is configured such that when the strap support 114 is coupled to the vehicle 100 and the strap 104 rests in the groove 116, there is a clearance 130 between the strap 104 and the spoiler 112. Thus, the portion of the straps 104 that would otherwise contact the spoiler 112 are elevated.

However, if the support 103 is positioned too low on the windshield 101, it may not have an adequate height 115 to provide clearance 130 between the straps 104 and the spoiler 112. Accordingly, if there is no clearance between the straps 104 and the spoiler 112 (e.g., the straps 104 have contact points 90 with the edge 106 or the top surface 108), the process 500 may return to step 502, and the support device 103 may be repositioned (e.g., moved closer to the top of the windshield 101). Additionally, or alternatively, extenders 126 may be added and/or activated to increase the height 115 and provide clearance 130.

Because the top of the groove 116 (i.e., height 115) is vertically higher than the spoiler 112, the straps 104 do not contact the top surface 108 and/or the edge 106 when there is clearance 130. More specifically, in some embodiments, the top of the groove 116 is above the top 107 of the edge 106. Accordingly, the spoiler 112 (and portions thereof) does not undergo undesirable contact with the straps 104, which would otherwise occur if not for the supports 114.

If there is clearance 130 between the straps 104 and the spoiler 112, then the process 500 proceeds to step 508, which couples the object to the rack 102. For example, the object may be the bicycle shown in FIG. 6.

The side view of FIG. 6 shows the support device 130 supporting a bicycle rack 102 with the bicycle 105 in accordance with illustrative embodiments of the invention. Illustrative embodiments provide clearance 130 between the straps 104 and the spoiler 112. A person of skill in the art understands that illustrative embodiments provide advantages in the art, including preventing the aforementioned damage to the spoiler 112. Accordingly, the process 500 may then proceed to step 510, where the user drives the vehicle 100 with the object without damaging the spoiler 112 of the vehicle 100.

It should be understood that the views provided in FIGS. 3A-3G are seven different views of the same embodiment. In some embodiments, the design of the rod 118 may be different. Accordingly, in some embodiments, the rod 118 may be shown in broken lines and/or the design of the rod 118 may be unclaimed. Applicant believes that the illustrated views are sufficient to support a filing for a design patent. However, it should be understood that not all illustrative embodiments are limited to the design shown herein.

Although illustrative embodiments refer to the straps 104, it should be understood that in some other embodiments different attachment mechanisms may be used to couple the rack 102 to the vehicle 100. Accordingly, illustrative embodiments may operate with a number of different attachment mechanisms and provide clearance to avoid the aforementioned damage to the spoiler 112 of the vehicle 100.

Additionally, while illustrative embodiments refer to the object as being the bicycle 105, it should be understood that a variety of other objects may be coupled to the vehicle 100 using illustrative embodiments of the invention. For example, kayaks, snowboards, surfboards, etc. may all be coupled to vehicles in accordance with illustrative embodiments of the invention.

Illustrative embodiments described herein may include methods that may be performed by a plurality of parties.

Accordingly, some embodiments include providing an instruction to perform any of the above described methods. Additionally, illustrative embodiments may be provided in the form of disassembled components which may be assembled in accordance with illustrative embodiments of the invention.

Although the above discussion discloses various exemplary embodiments of the invention, it should be apparent that those skilled in the art can make various modifications that will achieve some of the advantages of the invention without departing from the true scope of the invention.

What is claimed is:

1. A method of attaching a rack to a vehicle having a spoiler, the method comprising:
    providing a bicycle rack having straps, the straps having a first end and a second end;
    coupling the first end of a first strap of the straps to a strap attachment portion of a vehicle having a spoiler with an edge, the edge of the spoiler defining a spoiler height;
    positioning the first strap in a groove of a strap support, the strap support contacting a rear windshield of the vehicle, and a highest portion of the groove defining a groove height,
    wherein the strap support is positioned relative to the vehicle such that the groove height is greater than the spoiler height; and
    providing a second strap support coupled to the strap support on a rod, wherein a distance between the strap support and the second strap support is adjustable.

2. The method as defined by claim 1, further comprising:
    coupling a bicycle to the rack;
    tensioning the first strap; and
    providing a clearance between the first strap and the spoiler.

3. The method as defined by claim 1, further comprising:
    positioning the strap support up against the spoiler of the vehicle.

4. The method as defined by claim 1, wherein the strap support has a top surface and a bottom surface, the bottom surface configured to contact the rear windshield of the vehicle, and the top surface having the groove configured to receive the first strap.

5. The method as defined by claim 1, further comprising displacing the first strap above the edge of the spoiler of the vehicle, so as to provide clearance between the first strap and the spoiler when the first strap is used to secure an object to the vehicle, wherein the clearance is a vertical clearance and a horizontal clearance.

6. The method as defined by claim 1, the device further comprising:
    an extender configured to couple to a bottom surface of the strap support, the extender providing additional height to the strap support.

7. The method as defined by claim 6, wherein the additional height provides clearance between the first strap and the spoiler when the first strap is used to secure an object to the vehicle.

8. The method as defined by claim 6, wherein the extender is coupled to the strap support via attachment pins.

9. The method as defined by claim 1, wherein the strap support includes an adhesive on a bottom surface of the strap support.

10. The method as defined by claim 1, wherein the strap support comprises at least one of: foam, plastic, and/or rubber.

11. The method as defined by claim 1, wherein the rod includes end caps on each end configured to prevent the strap support from being dismounted from the rod.

12. The method as defined by claim 1, wherein the groove height is between about 4 inches and about 12 inches.

13. The method as defined by claim 12, wherein the groove height is about 7.5 inches.

14. The method as defined by claim 5, wherein the clearance is such that the first strap does not contact a top surface of the spoiler.

15. The method as defined by claim 1, further comprising:
    positioning a bottom surface of the strap support against the rear windshield of the vehicle.

16. The method as defined by claim 1, further comprising:
    coupling a first end of a second strap of the straps to a second strap attachment portion of the vehicle having the spoiler with the edge, the edge of the spoiler defining the spoiler height; and
    positioning the second strap in a groove of the second strap support, the second strap support contacting the rear windshield of the vehicle, and a highest portion of the groove of the second strap support defining a second groove height,
    wherein the second strap support is positioned relative to the vehicle such that the second groove height is greater than the spoiler height.

17. A method of attaching a rack to a vehicle having a spoiler, the method comprising:
    providing a bicycle rack having straps, the straps having a first end and a second end;
    coupling the first end of a respective one of the straps to a strap attachment portion of a vehicle having a spoiler with an edge, the edge of the spoiler defining a spoiler height;
    positioning the respective one of the straps in a groove of a strap support, the strap support contacting a rear windshield of the vehicle, and a highest portion of the groove defining a groove height,
    wherein the strap support is positioned relative to the vehicle such that the groove height is greater than the spoiler height; and
    providing an extender configured to couple to a bottom surface of the strap support, the extender providing additional height to the strap support, wherein the extender is coupled to the strap support via attachment pins.

18. The method as defined by claim 17, further comprising:
    coupling a bicycle to the rack;
    tensioning the straps;
    providing a clearance between the straps and the spoiler;
    positioning the strap support up against the spoiler of the vehicle.

19. The method as defined by claim 17, wherein the strap support has a top surface and a bottom surface, the bottom surface configured to contact the rear windshield of the vehicle, and the top surface having the groove configured to receive the respective one of the straps.

20. The method as defined by claim 17, further comprising displacing the respective one of the straps above the edge of the spoiler of the vehicle, so as to provide clearance between the respective one of the straps and the spoiler when the respective one of the straps is used to secure an object to the vehicle, wherein the clearance is a vertical clearance and a horizontal clearance.

* * * * *